May 8, 1956
C. J. MANN
2,744,499
ACTUATORS
Filed Aug. 12, 1954
2 Sheets-Sheet 1
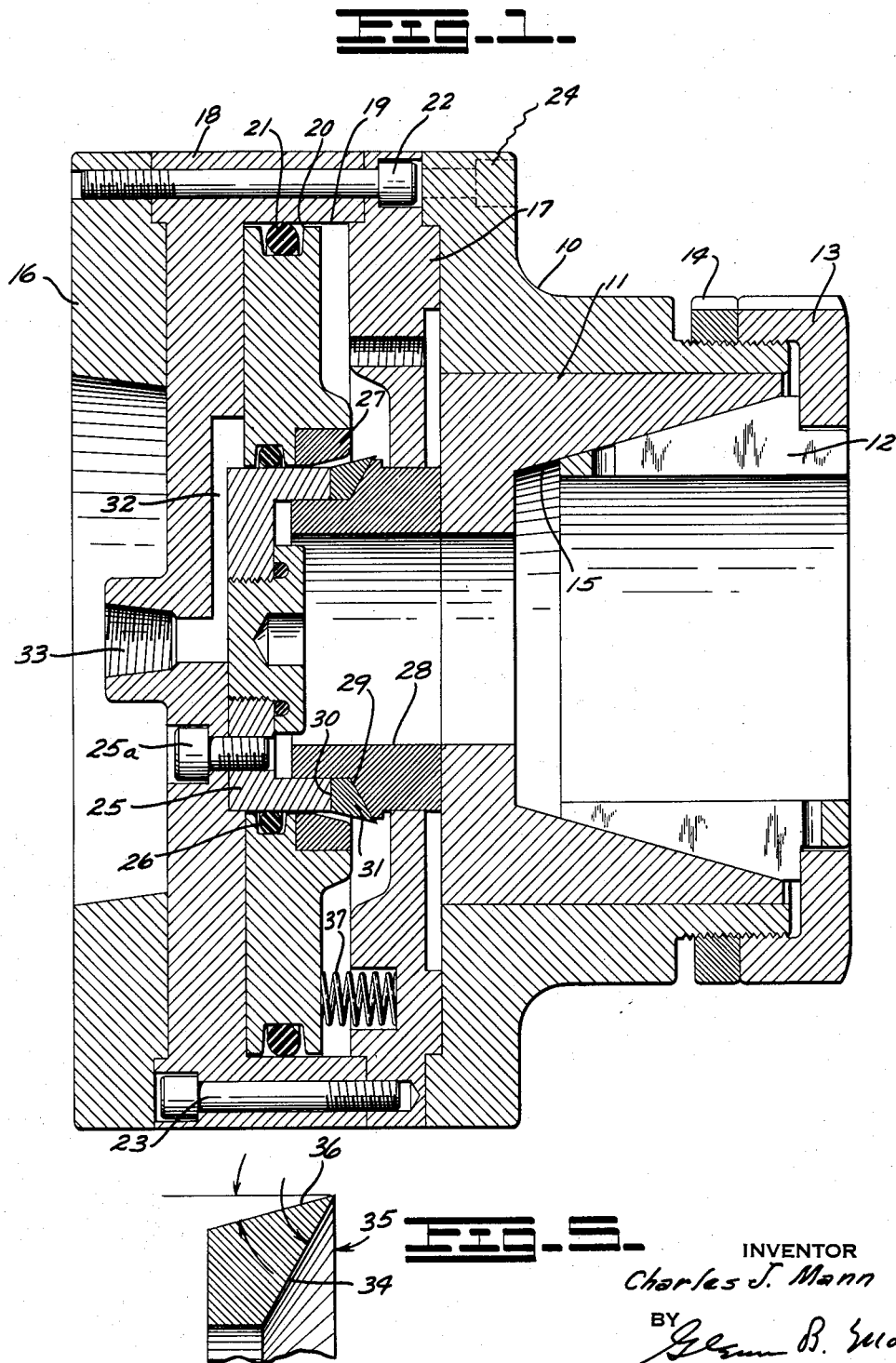
INVENTOR
Charles J. Mann
BY
ATTORNEY May 8, 1956 C. J. MANN 2,744,499
ACTUATORS
Filed Aug. 12, 1954 2 Sheets-Sheet 2
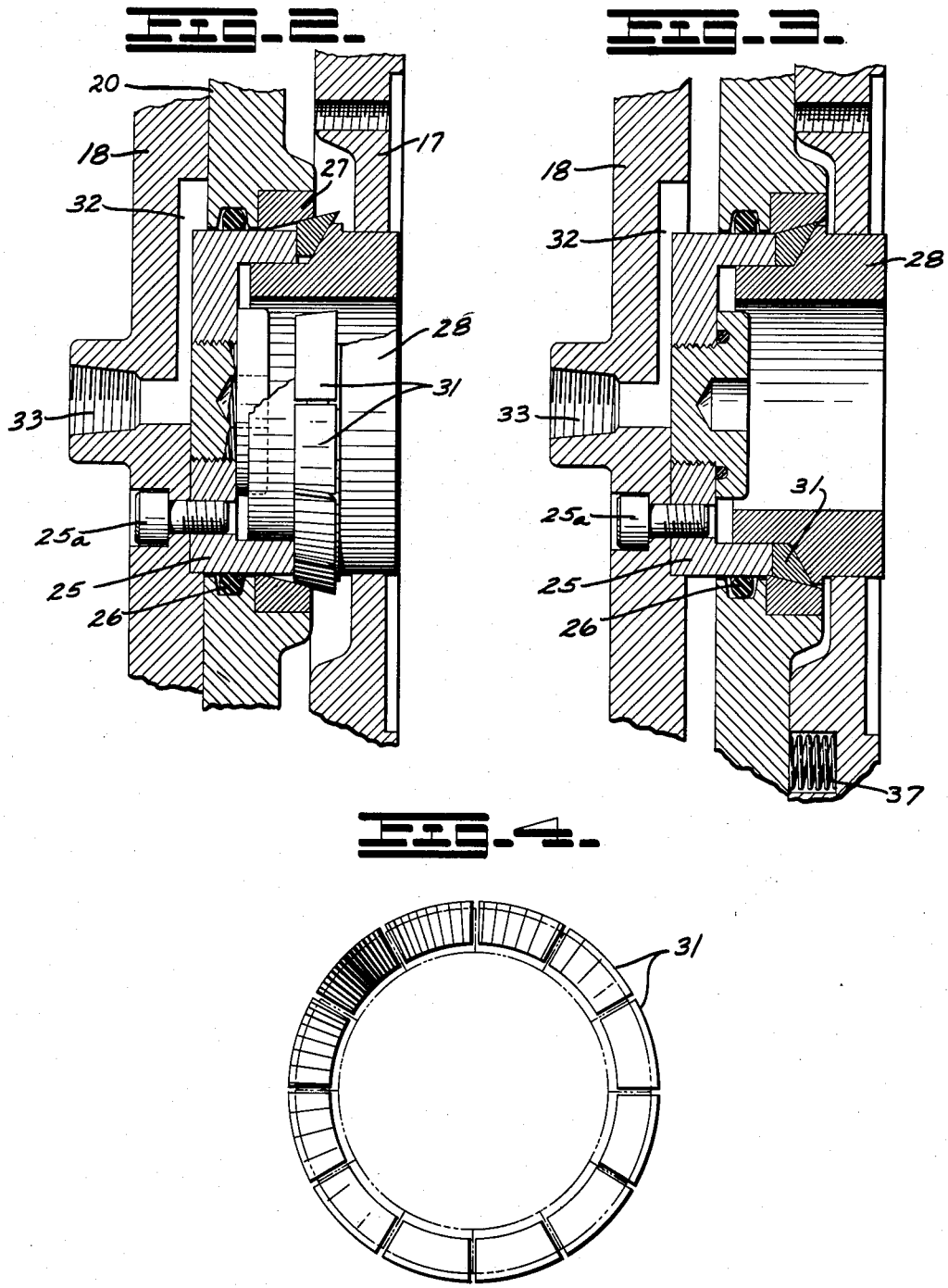
INVENTOR
Charles J. Mann
BY
ATTORNEY

United States Patent Office 2,744,499
Patented May 8, 1956

2,744,499
ACTUATORS

Charles J. Mann, Traverse City, Mich.

Application August 12, 1954, Serial No. 449,344

3 Claims. (Cl. 121—38)

This invention has been developed primarily for use in conjunction with chuck and collet actuators whose principal function is to deliver an output force over a relatively short travel at high mechanical advantage. These devices may conveniently be supplied with energy from compressed air or electromagnetic forces. Basically, the operation of a device of the type involved in this invention includes the relative movement of a series of members, one of which is controlled by the application of energy in the first instance. This movement is ordinarily coaxial, and the movable members are ordinarily each provided with an annular surface, the several surfaces being disposed to confine a member or series of members whose function is merely to transfer forces from the several annular surfaces involved. These surfaces are disposed at such an angle with respect to each other that a wedging action is generated as one of the elements is moved. Such movement of one of the members changes the relationship of the entrapped force-transmitting members so that the relative position of the other two members is altered in response. A mechanism of this type is shown and described in my copending application Serial Number 284,757 filed April 28, 1952, now Patent Number 2,709,599, issued May 31, 1955.

This invention provides an improvement over the disclosure of the application identified above primarily with regard to the formation and operation of the force transmitting means which are confined between the several relatively-movable annular surfaces. In that application, the entrapped units were shown preferably in the form of hardened steel balls. Experience has shown that the use of these balls tends to create forces of extremely high intensity at the point where the balls engage the several annular surfaces which confine them. Such concentration of force eventually causes deformity of the surfaces through wear, and in extreme cases may actually generate a local forging operation commonly referred to as "Brinelling", in which a crater is formed in the material through the application of pressure in excess of that which the material is capable of resisting without permanent deformation.

After considerable attention had been given to this problem of minimizing the concentration of forces on these annular surfaces, applicant discovered that a ring could be machined to a cross-section conforming to the several annular surfaces involved; and that after machining, hardening, and polishing the ring it could be cut into segments of sufficiently small size that the amount of movement involved would not create a sufficient amount of change of position of the mating surfaces to interfere with the operation of the device. The net result of this development is the presentation of substantial mating surfaces to the series of relatively movable members, rather than points of force transmission at high local intensity. The vast increase in surface area involved makes possible the more effective utilization of lubricants, and minimizes the effect of wear and local distortion to the point where the device as an overall piece of equipment becomes much more practical.

The features of this invention will be analyzed in detail through a discussion of a particular embodiment illustrated in the accompanying drawings. Referring to the drawings:

Figure 1 presents a sectional elevation through a unit which combines an actuator and a collet.

Figure 2 is a section through an actuator similar to that illustrated in Figure 1, showing the device in the retracted condition.

Figure 3 is a section through the same device illustrated in Figure 2, showing the unit in the extended, or force-applying condition.

Figure 4 is a view showing the annular group of ring segments used to transfer forces between the relatively movable elements of the actuator.

Figure 5 shows an enlarged view of the cross-section of the ring from which the segments are cut.

Referring to Figure 1, the illustrated device may be treated as including an actuator and a collet unit. The latter includes a frame member 10, an annular member 11 which is slideably received within the frame 10, a collet unit 12 which is capable of radial-expansion and contraction, a closure nut 13, and a lock nut 14. Axial movement of the member 11 with respect to the frame will cause the collet 12 to expand and contract due to the radial wedging action generated by the conical surface 15 against the similarly-formed surface of the collet. The conventional design of the collet 12 provides for staggered axial overlapping slots entering from left and right alternatively around the otherwise annular member, establishing a circumferential resilience. Conventionally, the collet is at all times under constriction by the surface 15, establishing a tendency for the member 11 to move to the left (as shown in Figure 1) as a result of the axial confinement of the collet 11. The closure nut 13 can be adjusted to a selected axial position because of its threaded engagement with the frame 10, so that the initial or expanded condition of the collet can be selectively determined. Having adjusted this position as desired, the lock nut 14 will serve to maintain the adjustment.

The function of the actuator unit which constitutes the remainder of the device in Figure 1 is to induce axial movement of the sliding member 11. The plates 16 and 17, together with the central member 18 may be considered as constituting a frame of the actuator. A cylinder 19 is formed in the central member 18, and the piston 20 with its sealing ring 21 moves axially within this cylinder. Bolts as indicated at 22 and 23 maintain the frame components in assembled relationship, and are spaced around the periphery of the unit. Similar bolts at other angular positions about the axis of the device than are illustrated in Figure 1 serve to secure the collet unit to the actuator. The position of these bolts is indicated generally in dotted lines in Figure 1 at 24. In the illustrated form of the device, a fixed cup-shaped member 25 is fixed with respect to the central frame member 18, and the annular piston 20 engages its periphery, the clearance therebetween being sealed by the ring 26. A hardened insert 27 on the piston defines an annular conical inside surface, and a thrust bushing 28 is provided with a conical shoulder 29. The end surface 30 of the cup member 25, together with the surface 29 on the thrust bushing 28 define an annular space which diverges outwardly. The inner annular surface on the piston insert 27 is disposed opposite this annular space at the wider end thereof, and it will be noted that axial movement of the piston will cause engagement of the insert 27 with the wedging segments 31 as the piston 20 moves to the right as shown in Figure 1. Figure 1 shows the group of wedging ring elements in the fully constricted condition, but with the piston withdrawn to the left where forces are not applied. Referring to Figure 2, an actuator is shown with the same piston position, but with the thrust bushing also retracted so that the ring elements are in their radiantly-outward position. Application of air pressure behind the piston 20 through the duct 32 and the inlet opening 33 will result in movement of the piston to the right, accompanied by inward movement of the ring elements to the position shown in Figure 3. The inward movement of the ring elements driven by the conical surface of the piston insert gives a wedging action tending to separate the shoulder 29 of the thrust bushing from the face 30 of the cup.

The formation of the ring elements 31 preferably includes the machining of a solid ring having the cross-section illustrated in Figure 5. The surface 34 forms a conical surface which engages the shoulder 29 of the thrust bushing, and should preferably be oriented so that the elements make an angle 35 of approximately 30 degrees with a plane perpendicular to the axis of the unit. The outer annular surface 36 is formed to fit with the inner surface of the insert 27 of the piston, and it is preferred that the elements of the conical surface should make an angle with the elements of a circumscribed cylinder of approximately arc tan .247. After a ring which has been machined to this configuration has been hardened, ground, and polished, it is preferably split into about 12 equal pieces with a splitting wheel approximately 10%000 of an inch in thickness. After the removal of burs and sharp edges, these ring elements may be inserted in the assembly shown in the drawings, where their function is to transfer forces from the several annular surfaces which confine the annular ring elements in position. Figure 4 illustrates the grouping of the elements in the outer position represented by Figure 2 in full lines, while the constricted position shown in Figure 3 is illustrated in dotted lines. The various angles which control the cross-section of the wedging ring, and also the angle of the elements forming the surface 15 may be varied according to whether or not a self-locking unit is desired. To obtain a relatively high mechanical advantage with respect to the movement of the piston, it is probable that the inner surfaces of the piston insert 27 would be formed at an angle which would be self-locking. Return springs as indicated at 37, however, are disposed around the unit to return the piston to the position shown in Figure 1 on release of the air pressure.

The particular embodiments of the present invention which have been illustrated and discussed herein are for illustrative purposes only, and are not to be considered as a limitation upon the scope of the appended claims. In these claims, it is my intent to claim the entire invention disclosed herein, except as I am limited by the prior art.

I claim:

1. An actuator having a frame, cylinder means in said frame, a first member, said first member having an annular surface, a second member, said second member being slideably mounted for movement with respect to said first member parallel to the axis of said annular surface, said second member also having an annular surface, said first and second member annular surfaces forming a diverging space therebetween, an actuating member slideably mounted in said frame for movement parallel to said axis, said actuating member having a piston portion cooperating with said cylinder, and also having an annular surface disposed opposite the larger portion of said diverging space, said piston portion annular surface being axially tapering in diameter: force-transmitting means confined between said annular surfaces comprising segments of an annular ring having surfaces thereon disposed to register with said annular surfaces whereby axial movement of said piston in the direction of divergence of the annular surface thereof will induce a component of radially inward movement of said force-transmitting means creating a wedging action causing axial separation of said first and second members.

2. An actuator having a frame, a first member, said first member having an annular surface, a second member, said second member being slideably mounted for movement with respect to said first member parallel to the axis of said annular surface, said second member also having an annular surface, said first and second member annular surfaces forming a diverging space therebetween, an actuating member slideably mounted in said frame for movement parallel to said axis and also having an annular surface disposed opposite the larger portion of said diverging space, said piston portion annular surface being axially tapering in diameter: force-transmitting means confined between said annular surfaces comprising segments cut from an annular ring having surfaces thereon disposed to register with said annular surfaces whereby axial movement of said actuating member will induce a component of radial movement of said force-transmitting means creating a wedging action causing axial separation of said first and second members.

3. An actuator having a frame, a first member, said first member having an annular surface, a second member, said second member being slideably mounted for movement with respect to said first member parallel to the axis of said annular surface, said second member also having an annular surface, said first and second member annular surfaces forming a diverging space therebetween, an actuating member slideably mounted in said frame for movement parallel to said axis and also having an annular surface disposed opposite the larger portion of said diverging space, said piston portion annular surface being axially tapering in diameter: force-transmitting means confined between said annular surfaces and comprising segments of an annular ring having surfaces thereon disposed to register with said annular surfaces whereby axial movement of said actuating member will induce a component of radial movement of said force-transmitting means creating a wedging action causing axial separation of said first and second members.

References Cited in the file of this patent

UNITED STATES PATENTS

| 2,685,275 | Caldwell | Aug. 3, 1954 |

FOREIGN PATENTS

| 607,413 | France | Mar. 26, 1926 |
| 638,215 | Great Britain | June 7, 1950 |